United States Patent
Hoang

[11] Patent Number: 5,963,079
[45] Date of Patent: Oct. 5, 1999

[54] TEMPERATURE INDICATOR CIRCUIT WITH TEMPERATURE HYSTERESIS

[75] Inventor: Tuong Hai Hoang, San Jose, Calif.

[73] Assignee: National Semiconductor Corporation, Santa Clara, Calif.

[21] Appl. No.: 09/058,022

[22] Filed: Apr. 10, 1998

[51] Int. Cl.[6] ............................. H01L 35/00; H03K 3/037
[52] U.S. Cl. ......................... 327/512; 327/205; 327/83; 327/74
[58] Field of Search .................................... 327/512, 513, 327/68, 71, 74, 75, 76, 205, 206, 77, 83, 534, 537

[56] References Cited

U.S. PATENT DOCUMENTS

| | | | |
|---|---|---|---|
| 4,546,238 | 10/1985 | Ahs | 219/497 |
| 4,851,954 | 7/1989 | Surig | 327/513 |
| 5,278,796 | 1/1994 | Tillinghast et al. | 365/222 |
| 5,455,510 | 10/1995 | Nelson | 327/513 |
| 5,603,220 | 2/1997 | Seaman | 62/3.7 |

Primary Examiner—Toan Tran
Attorney, Agent, or Firm—Limbach & Limbach LLP

[57] ABSTRACT

A logic circuit for providing hysteresis in the sensing of the temperature of an integrated circuit includes two voltage comparators and a D-type flip-flop. Each of the comparators compares a reference voltage and a respective one of two voltage signals which represent and vary in respective relations to the temperature of the integrated circuit. The resulting binary output signals of the comparators are asserted and de-asserted at different approximate temperatures, i.e., with one being higher and the other being lower with respect to one another. One comparator output signal serves as both the input data signal and output clear control signal for the flip-flop while the other serves as the clock signal. Accordingly, the output signal of the flip-flop is asserted during a time which follows an increase in the measured temperature above the higher approximate temperature value and precedes a decrease in the measured temperature below the lower approximate temperature value.

35 Claims, 5 Drawing Sheets

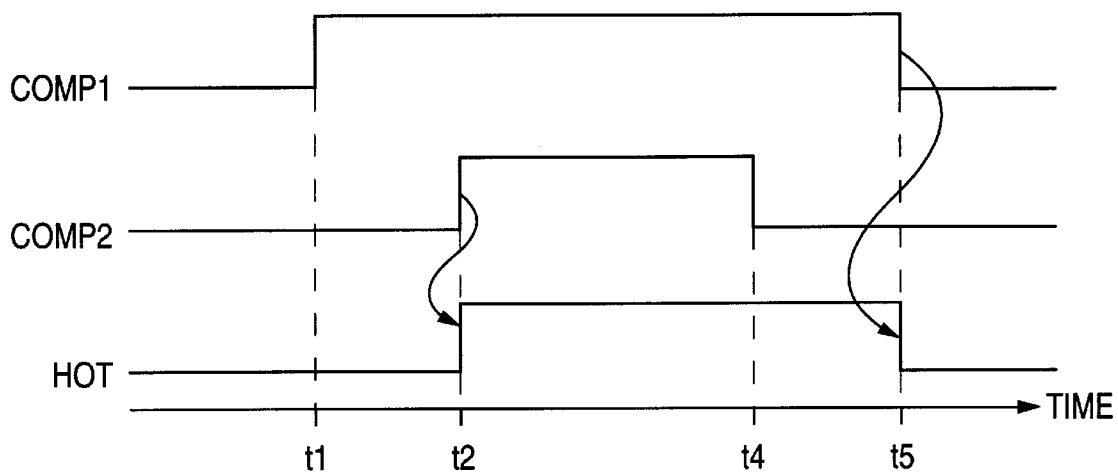
FIGURE 5
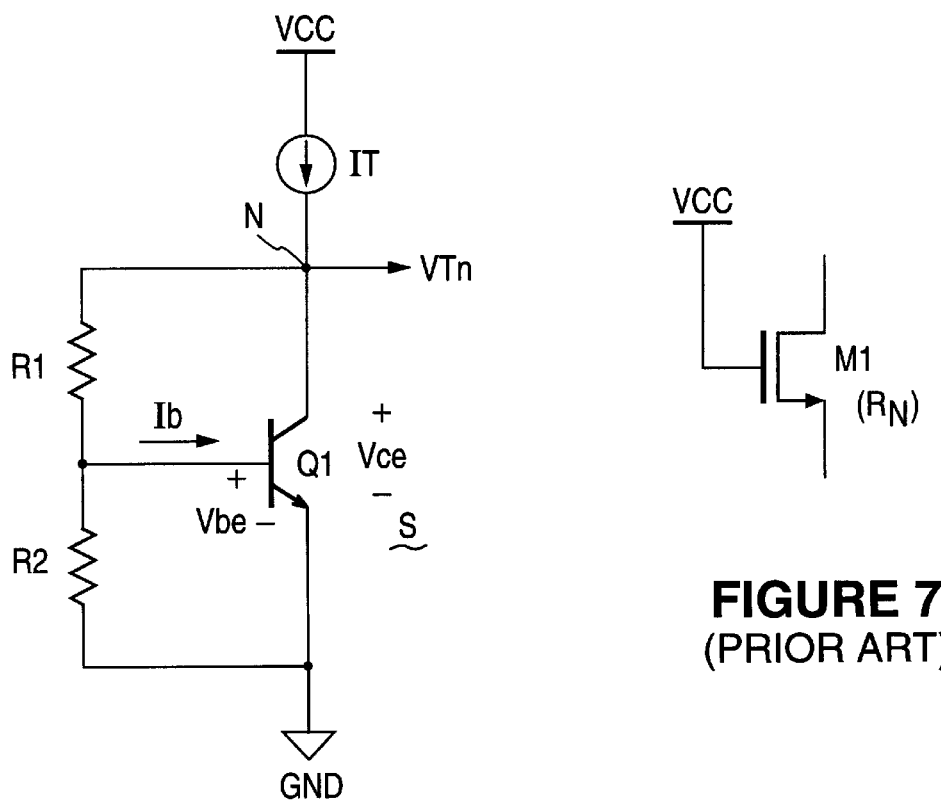
FIGURE 6
FIGURE 7
(PRIOR ART)

TEMPERATURE INDICATOR CIRCUIT WITH TEMPERATURE HYSTERESIS

BACKGROUND OF THE INVENTION

1. Field of the Invention

The present invention relates to circuits for sensing and indicating the temperature of an integrated circuit, and in particular, to such temperature indicator circuits having temperature hysteresis.

2. Description of the Related Art

Uses of temperature sensing circuitry within integrated circuits have been on the rise and continue to increase. Reasons for this include desires to monitor the temperature of chips which, due to operations at significantly increased clock speeds, often operate at temperatures which, depending upon the operating environment, can approach or even exceed maximum temperature limits or cause serious degradation in the performance characteristics of such chips.

Additionally, the users of some chips wish to know the temperature of the chip so as to plan for and implement power reduction techniques, such as reducing clock speed, prior to reaching some predetermined temperature limit. By knowing the temperature of the chip prior to reaching the predetermined limit, plans can be made for implementation of power reduction techniques, such as reducing or changing the level or type of data processing being performed prior to the planned reduction in clock speed. This allows the overall temperature of the chip to be reduced by slowing down or otherwise modifying its operating characteristics without requiring that the chip instead be temporarily disabled.

Referring to FIG. 1, a conventional approach to generating a signal VOUT which corresponds to the temperature being monitored is to use a voltage comparator 10 with hysteresis (in terms of when the output VOUT changes state due to a change in the relative values of the input signals VREF and VX). The reference voltage VREF is typically the output of a digital-to-analog converter (DAC) and is generally quite stable over temperature variations. The temperature signal VX is a voltage generated by a temperature sensor circuit and varies substantially linearly over variations in temperature. Such a temperature signal VX has either a positive or negative temperature coefficient. In this example, temperature voltage VX is presumed to have a negative temperature coefficient.

In such an implementation, the hysteresis of the comparator 10 is critical due to the difficulty in maintaining the consistency of the window temperature error, typically in the range of five degrees Celsius. In order to achieve and maintain such a small and consistent hysteresis window, it is often necessary to process numerous iterations of the integrated circuit in which such a circuit is to be used so as to ensure such consistency regardless of variations in fabrication properties, power, etc.

Conventional techniques for generating the temperature-dependent voltage VX include: monitoring the voltage drop Vbe across a forward biased base-emitter junction of a bipolar junction transistor (BJT); monitoring the reverse breakdown voltage of the base-emitter diode of a BJT; monitoring the voltage from the collector to the emitter of a current saturated BJT; or monitoring the ratio of diffused resistors within the integrated circuit. While each of these techniques are useful in that they rely upon predictable device parameters, a significant disadvantage to such techniques is that the dynamic range of the change in voltage over a useful temperature range is quite small. Accordingly, when comparing such a voltage with such a small dynamic range against a reference voltage generated by an N-bit DAC, the voltage of such DAC which corresponds to its least significant bit (LSB) is very small. This makes the DAC difficult to design and maintain with respect to consistency of its performance characteristics.

Accordingly, it would be desirable to have a circuit for sensing and indicating substrate temperatures which overcomes such problems.

SUMMARY OF THE INVENTION

A circuit in accordance with the present invention uses the difference between the voltage-versus-temperature characteristics of two temperature-dependent signals for generating and maintaining the desired temperature hysteresis for generating an output signal which indicates a measured temperature level.

In accordance with one embodiment of the present invention, a temperature indicator circuit with temperature hysteresis includes signal comparison circuits and a signal state indicating circuit. The first signal comparison circuit is configured to receive and compare a reference signal and a first temperature signal and in accordance therewith provide a first comparison signal with first and second signal states such that: the reference signal corresponds to a reference temperature; the first temperature signal varies in relation to a measured temperature; the first signal state indicates when the first comparison signal has a first signal polarity relative to the reference signal; the second signal state indicates when the first comparison signal has a second polarity relative to the reference signal and opposite to the first signal polarity; and the first comparison signal transitions between the first and second signal states at a first approximate value of the measured temperature. A second signal comparison circuit is configured to receive and compare the reference signal and a second temperature signal and in accordance therewith provide a second comparison signal with third and fourth signal states such that: the second temperature signal varies in relation to the measured temperature; the third signal state indicates when the second comparison signal has a third signal polarity relative to the reference signal; the fourth signal state indicates when the second comparison signal has a fourth polarity relative to the reference signal and opposite to the third signal polarity; and the second comparison signal transitions between the third and fourth signal states at a second approximate value of the measured temperature which is higher than the first measured approximate temperature value. The signal state indicating circuit, coupled to the first and second signal comparison circuits, is configured to receive the first and second comparison signals and in accordance therewith provide a state signal indicating a time which follows an increase in the measured temperature above the second approximate value and precedes a decrease in the measured temperature below the first approximate value.

In accordance with another embodiment of the present invention, an integrated circuit with a temperature indicator circuit having temperature hysteresis includes a substrate, a temperature sensing circuit, a reference signal circuit, signal comparison circuits and a signal state indicating circuit. The substrate includes a functional circuit integrated therein. The temperature sensing circuit, integrated within the substrate, is configured to measure a temperature of the substrate and in accordance therewith provide first and second temperature signals which vary in respective relations to the measured temperature. The reference signal circuit, integrated within the substrate, is configured to provide a reference signal which corresponds to a reference temperature. The first signal comparison circuit, integrated within the substrate and coupled to the reference signal circuit and the temperature sensing circuit, is configured to receive and compare the reference signal and the first temperature signal and in accordance therewith provide a first comparison signal with first and second signal states such that: the first signal state indicates when the first comparison signal has a first signal polarity relative to the reference signal; the second signal state indicates when the first comparison signal has a second polarity relative to the reference signal and opposite to the first signal polarity; and the first comparison signal transitions between the first and second signal states at a first approximate value of the measured temperature. A second signal comparison circuit, integrated within the substrate and coupled to the reference signal circuit and the temperature sensing circuit, is configured to receive and compare the reference signal and the second temperature signal and in accordance therewith provide a second comparison signal with third and fourth signal states such that: the third signal state indicates when the second comparison signal has a third signal polarity relative to the reference signal; the fourth signal state indicates when the second comparison signal has a fourth polarity relative to the reference signal and opposite to the third signal polarity; and the second comparison signal transitions between the third and fourth signal states at a second approximate value of the measured temperature which is higher than the first measured approximate temperature value. The signal state indicating circuit, integrated within the substrate and coupled to the first and second signal comparison circuits, is configured to receive the first and second comparison signals and in accordance therewith provide a state signal indicating a time which follows an increase in the measured temperature above the second approximate value and precedes a decrease in the measured temperature below the first approximate value.

In accordance with still another embodiment of the present invention, a method of indicating temperature with temperature hysteresis includes the steps of:

receiving a reference signal which corresponds to a reference temperature;

receiving first and second temperature signals which vary in respective relations to a measured temperature;

comparing the reference signal and the first temperature signal and in accordance therewith generating a first comparison signal with first and second signal states by generating said first signal state when said first comparison signal has a first signal polarity relative to said reference signal, generating said second signal state when said first comparison signal has a second polarity relative to said reference signal and opposite to said first signal polarity, and transitioning said first comparison signal between said first and second signal states at a first approximate value of said measured temperature;

comparing the reference signal and the second temperature signal and in accordance therewith generating a second comparison signal with third and fourth signal states by generating said third signal state when said second comparison signal has a third signal polarity relative to said reference signal, generating said fourth signal state when said second comparison signal has a fourth polarity relative to said reference signal and opposite to said third signal polarity, and transitioning said second comparison signal between said third and fourth signal states at a second approximate value of said measured temperature which is higher than said first measured approximate temperature value; and receiving the first and second comparison signals and in accordance therewith generating a state signal indicating a time which follows an increase in the measured temperature above the second approximate value and precedes a decrease in the measured temperature below the first approximate value.

In accordance with yet another embodiment of the present invention, a method of indicating the temperature of an integrated circuit with temperature hysteresis includes the steps of:

measuring, within a substrate which includes a functional circuit integrated therein, a temperature of the substrate and in accordance therewith generating first and second temperature signals which vary in respective relations to the measured temperature;

generating, within the substrate, a reference signal which corresponds to a reference temperature;

comparing, within the substrate, the reference signal and the first temperature signal and in accordance therewith generating a first comparison signal with first and second signal states by generating the first signal state when the first comparison signal has a first signal polarity relative to the reference signal, generating the second signal state when the first comparison signal has a second polarity relative to the reference signal and opposite to the first signal polarity, and transitioning the first comparison signal between the first and second signal states at a first approximate value of the measured temperature;

compare, within the substrate, the reference signal and the second temperature signal and in accordance therewith generating a second comparison signal with third and fourth signal states by generating the third signal state when the second comparison signal has a third signal polarity relative to the reference signal, generating the fourth signal state when the second comparison signal has a fourth polarity relative to the reference signal and opposite to the third signal polarity, and transitioning the second comparison signal between the third and fourth signal states at a second approximate value of the measured temperature which is higher than the first measured approximate temperature value; and receiving the first and second comparison signals and in accordance therewith generating, within the substrate, a state signal indicating a time which follows an increase in the measured temperature above the second approximate value and precedes a decrease in the measured temperature below the first approximate value.

These and other features and advantages of the present invention will be understood upon consideration of the following detailed description of the invention and the accompanying drawings.

BRIEF DESCRIPTION OF THE DRAWINGS

FIG. 5 is a signal timing diagram for the signals in the circuit of FIG. 2.

FIG. 6 is a schematic diagram of a temperature sensing circuit suitable for use with the temperature indicator circuit of FIG. 2.

FIG. 7 illustrates a conventional technique for biasing a metal oxide semiconductor field effect transistor (MOSFET) for use as a resistive element.

DETAILED DESCRIPTION OF THE INVENTION

Figure 1:
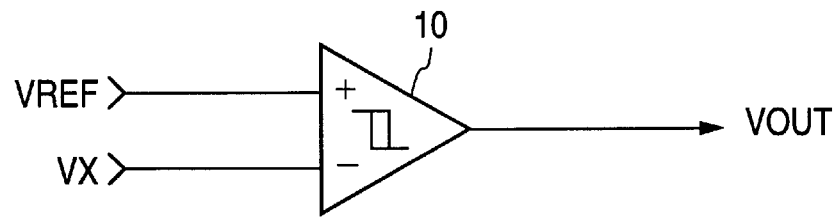
FIG. 1 is a representation of a conventional voltage comparator with hysteresis.
Figure 2:
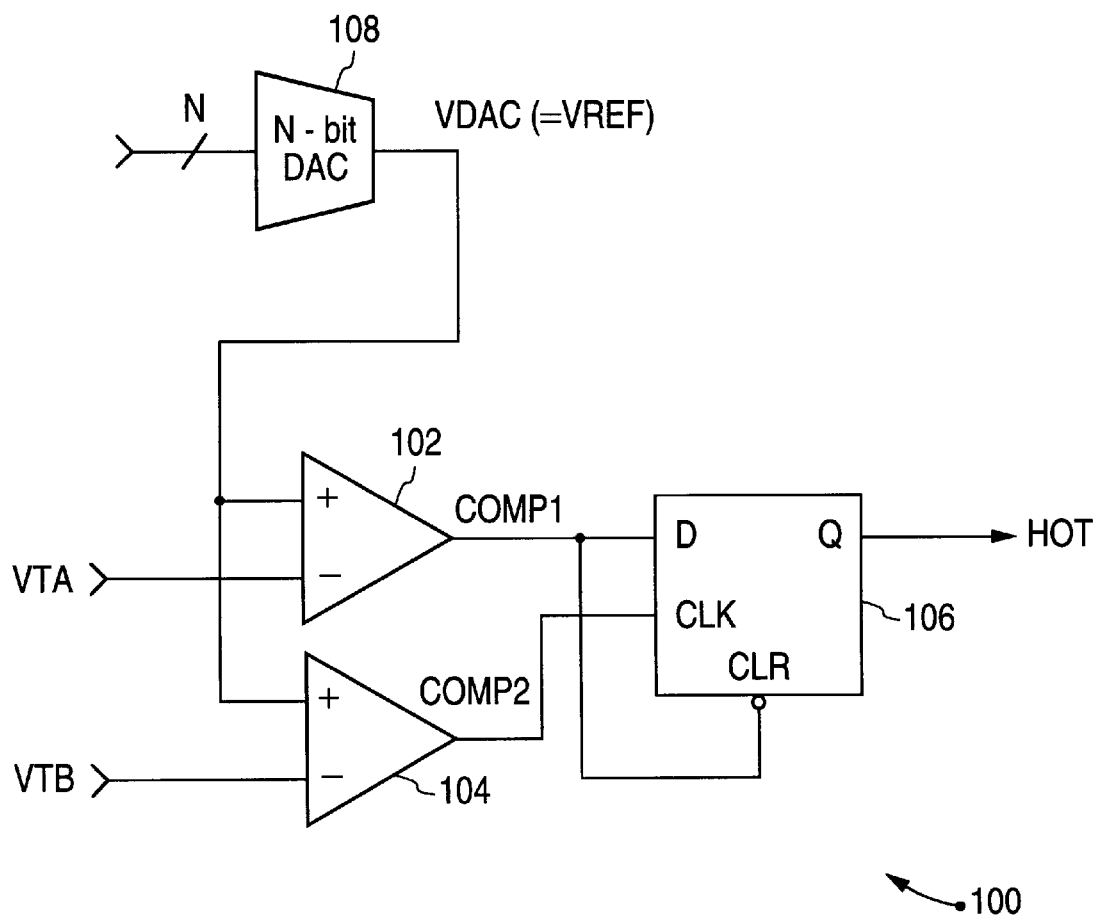
FIG. 2 is a schematic diagram of a temperature indicator circuit with temperature hysteresis in accordance with one embodiment of the present invention.

Referring to FIG. 2, a temperature indicator circuit with temperature hysteresis in accordance with one embodiment of the present invention includes two voltage comparators 102, 104 and a D-type flip-flop 106, interconnected substantially as shown. Two temperature-dependent voltage signals VTA, VTB (discussed in more detail below) are compared against a voltage reference VDAC generated by an N-bit DAC 108. The resulting comparator output signals COMP1, COMP2 drive the flip-flop 106. The first comparator signal COMP1 serves as the data input signal D, as well as the output clear control signal CLR. The second comparator output signal COMP2 serves as the clock signal CLK. Accordingly, when the first comparator output signal COMP1 is high and the second comparator output signal COMP2 transitions from a low state to high state, the output signal HOT of the flip-flop 106 is asserted in a high state. When the first comparator output signal COMP1 transitions to a low state, the flip-flop output signal HOT is then driven to a low state.

Figure 3:
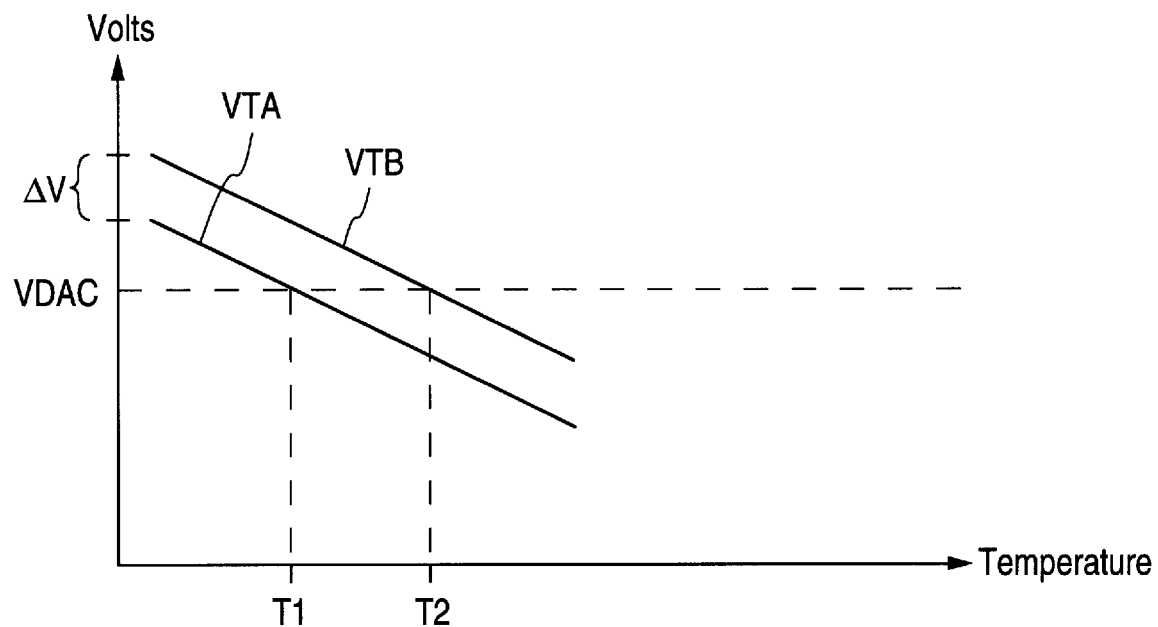
FIG. 3 is a graph of voltage versus temperature useful for understanding the operation of the circuit of FIG. 2.
Figure 4:
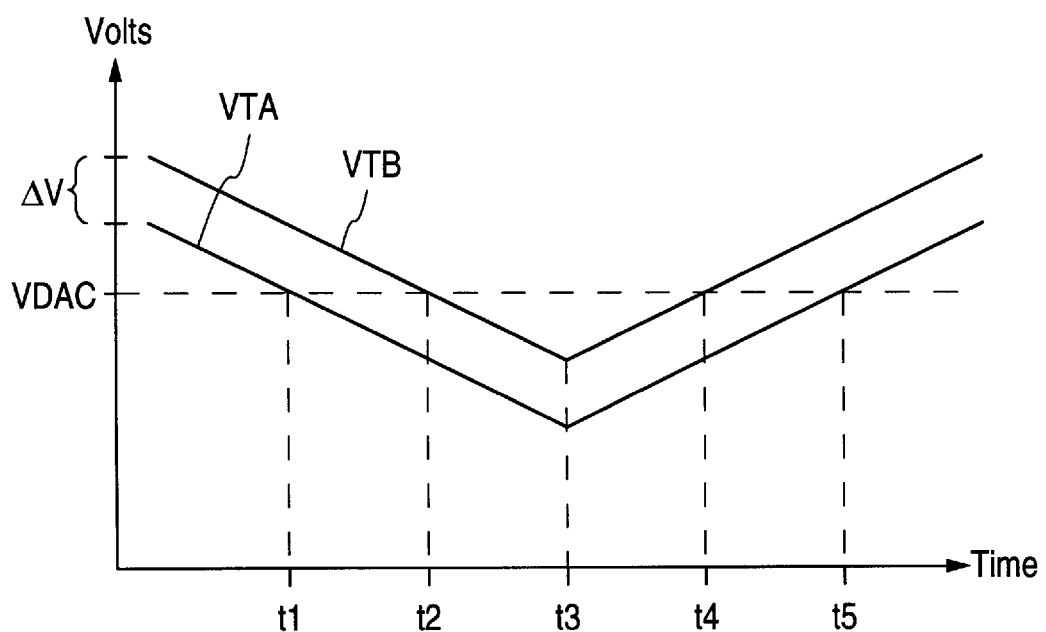
FIG. 4 is a graph of voltage versus time useful for understanding the operation of the circuit of FIG. 2.

Referring to FIGS. 3, 4 and 5 together, operation of the circuit of FIG. 2 in relation to the temperature-dependent voltage signals VTA, VTB can be better understood. As temperature increases, the temperature-dependent voltage signals VTA, VTB decrease in value (due to negative temperature coefficients). At temperatures T1 and T2, at times t1 and t2, voltage signals VTA and VTB, respectively, transcend the reference voltage VDAC due to the voltage difference ΔV between the temperature-dependent voltage signals VTA, VTB. (As will be better understood following this discussion, it is this voltage difference ΔV which creates and maintains the temperature hysteresis for the circuit 100 of FIG. 2). At temperature T3 at time t3, the temperature reverses and begins to decrease. Accordingly, at times t4 and t5 (which correspond to temperatures T2 and T1, respectively), voltage signals VTB and VTA, respectively, again transcend the reference voltage VDAC, but now in the opposite direction.

Accordingly, the relative timing of the comparator output signals COMP1, COMP2 and flip-flop output signal HOT are as shown in FIG. 5. Comparator signal COMP1 is driven high at time t1 and low at time t5, while comparator signal COMP2 is driven high at time t2 and low at time t4. Hence, the flip-flop signal HOT is driven high at time t2 due to the assertion of the clock signal COMP2, and is driven low at time t5, due to the assertion of the clear signal COMP 1. With respect to the original temperature-dependent voltage signals VTA, VTB, the temperature indication signal HOT is driven to a high state following an increase in the measured temperature above the higher T2 of two temperatures T1, T2 (i.e., corresponding to the second temperature-dependent signal VTB) and precedes a decrease in the measured temperature below the lower T1 of such two temperatures (i.e., corresponding to the first temperature-dependent signal VTA).

Referring to FIG. 6, a temperature sensing circuit suitable for use with the temperature indicator circuit of FIG. 2 includes an NPN bipolar junction transistor Q1 biased by a voltage divider biasing circuit with two resistive elements R1, R2, both of which are driven by a constant current IT. (A constant current IT is used, e.g., as opposed to a voltage bias technique, so as to maintain a constant base-emitter bias voltage Vbe for the transistor Q1 regardless of variations in the power supply voltage VCC.) The temperature-dependent voltage signal VTN is provided at node N which is also used to receive and distribute the constant current IT to the transistor Q1 and resistors R1, R2. The output voltage Vce (=VTn) across the transistor Q1 will be:

$$Vce = R1 \cdot \left( Ib + \frac{Vbe}{R2} \right) + Vbe \quad (1)$$

$$\approx Vbe \cdot \left( \frac{R1 + R2}{R2} \right) \quad (2)$$

Since the resistors R1, R2 are integrated within the same substrate S, they are fabricated from a common material. Accordingly, the ratio of resistances as shown in Equation 2 above will be independent of temperature as shown below:

$$\frac{R1(1 + \Delta R) + R2(1 + \Delta R)}{R2(1 + \Delta R)} = \left( \frac{R1 + R2}{R2} \right) \cdot \frac{(1 + \Delta R)}{(1 + \Delta R)} = \frac{R1 + R2}{R2} \quad (3)$$

Accordingly, the temperature-dependent voltage VTn, which is also the voltage Vce across the transistor Q1, will be a voltage which is multiplied up from the base-emitter voltage Vbe by the ratio (R1+R2)/R2 which is always larger than 1. This allows the temperature-dependent voltage VTn to be established by setting the multiplication factor (R1+R2)/R2. Further, this voltage VTn can be established at a sufficiently high magnitude so as to allow the resolution of the reference voltage VDAC provided by the DAC 108 (FIG. 2) to be decreased, thereby keeping the steps corresponding to the least significant bit of the DAC 108 within a more reasonable range with respect to conventional design parameters for the DAC 108.

Figure 8:
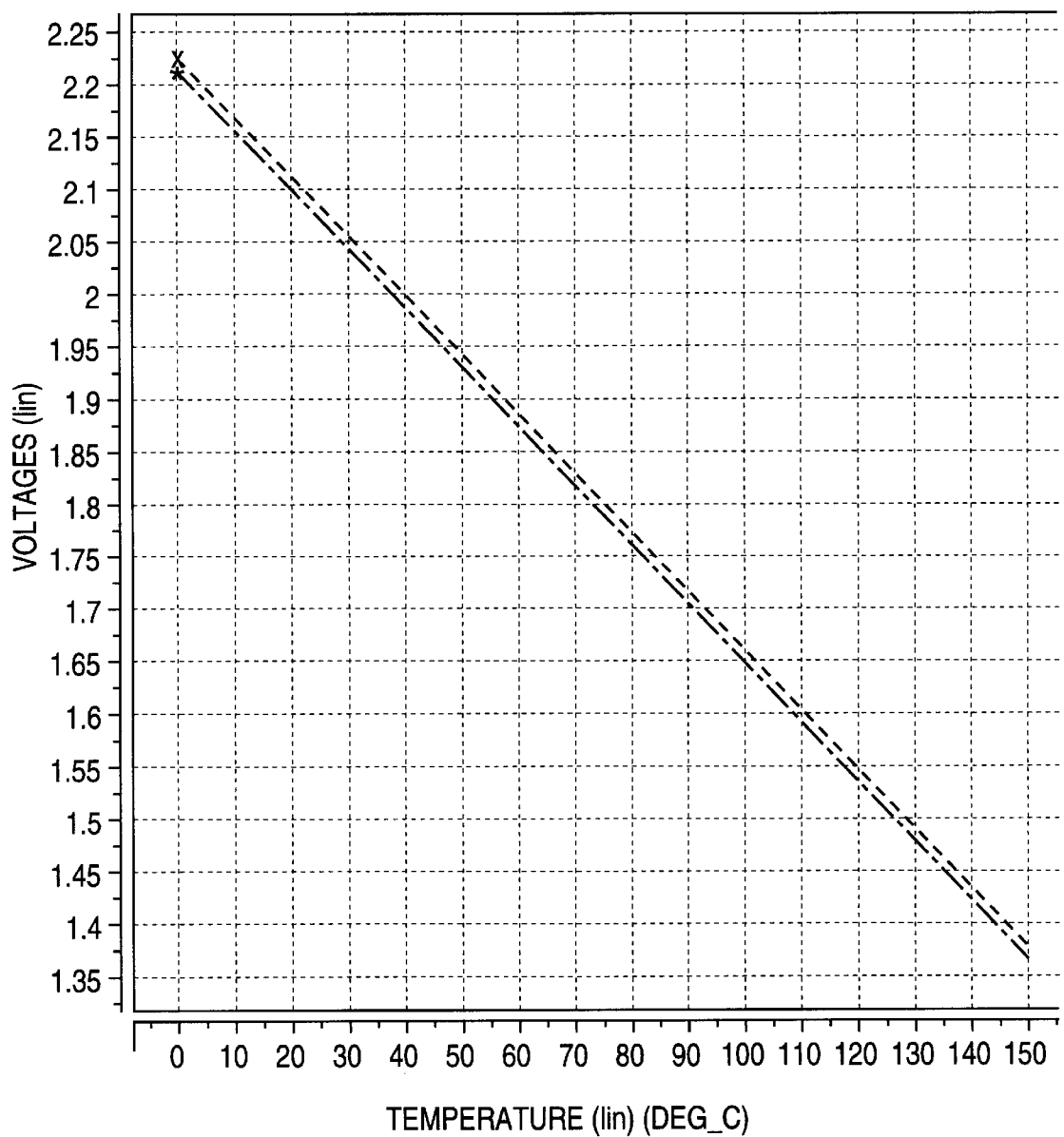
FIG. 8 is a graph of simulated voltage-versus-temperature characteristics for the collector-to-emitter voltage in the circuit of FIG. 6 based upon two different transistor models.

Referring to FIG. 7, the resistors R1, R2, when integrated within a substrate S, can each be implemented with a MOSFET M1 having a constant bias voltage (e.g., power supply voltage VCC) applied at its gate terminal. Further, another advantage of having a constant base-emitter bias available for the transistor Q1 is that the implementation or design for such transistor Q1 becomes less critical. For example, referring to FIG. 8, it can be seen that only slight variations in the output voltage Vce across the transistor Q1 will occur for two different implementations of the transistor Q1. For example, as shown in FIG. 8, the voltage versus temperature graphs for two different transistor implementations based upon different SPICE models (e.g., "fast" and "typical") are almost identical.

Based upon the foregoing, it will be recognized that by using two implementations of the circuit of FIG. 6, the two distinct temperature-dependent voltage signals VTA, VTB used by the circuit of FIG. 2 can be provided. The higher temperature-dependent voltage signal VTB can be provided by increasing the value of resistor R1 (FIG. 6) by a predetermined amount R', depending upon the desired amount of hysteresis ΔV (FIGS. 3 and 4) desired. Accordingly, the two temperature-dependent voltage signals VTA, VTB will be:

$$VTA = \frac{R1 + R2}{R2} \cdot Vbe \qquad (4)$$

$$VTB = \left(\frac{(R1 + R') + R2}{R2}\right) \cdot Vbe \qquad (5)$$

Figure 9:
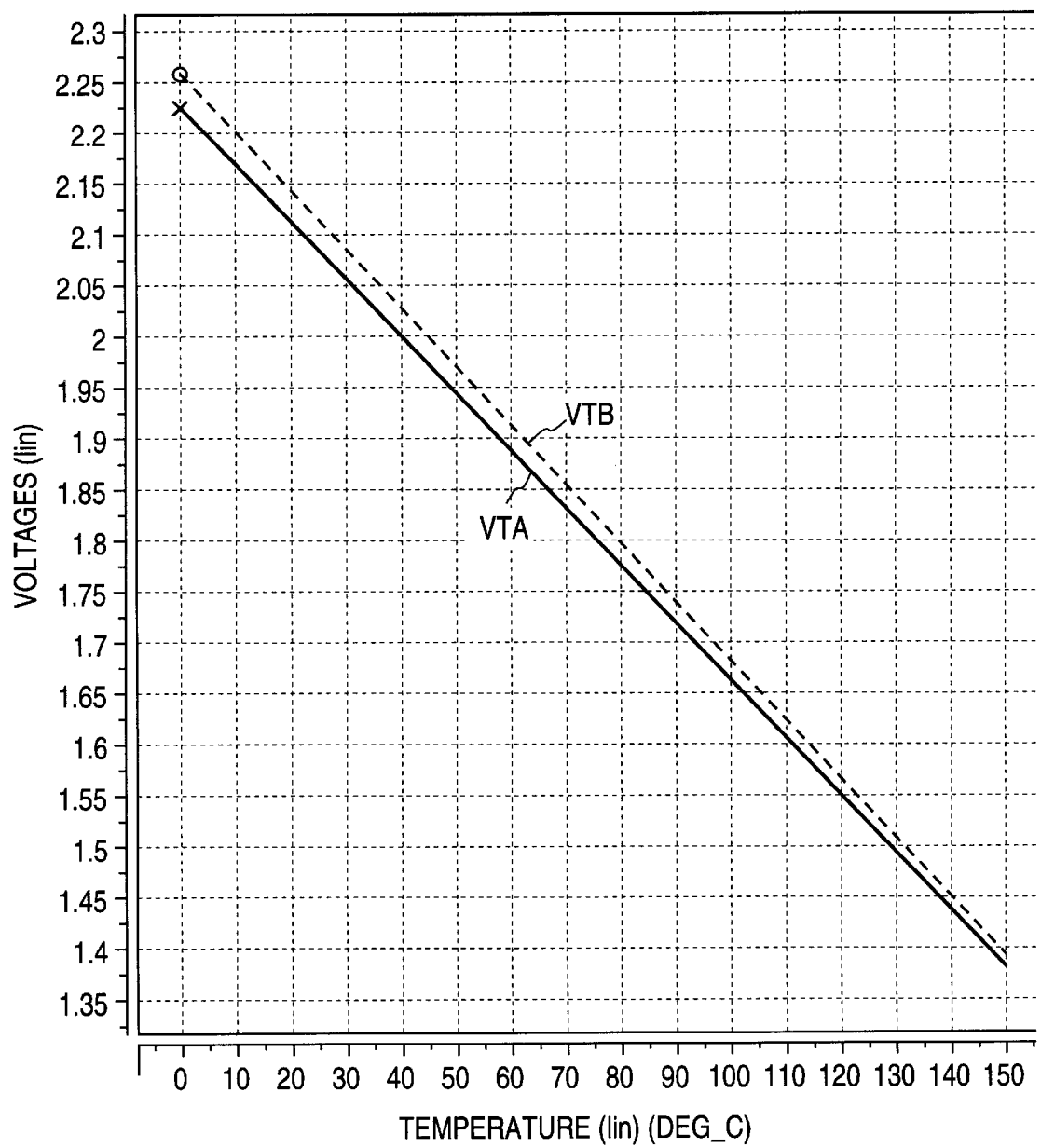
FIG. 9 is a graph of simulated voltage-versus-temperature characteristics for two different temperature-dependent voltages generated by circuits implemented in accordance with the schematic of FIG. 6.

Referring to FIG. 9, it can be seen that simulations of these two voltage signals VTA, VTB track each other very closely over a wide range of temperature. While the graphs for these signals VTA, VTB are not exactly parallel, provided that the difference in the resistance value R' is small compared to the original value of resistor R1, and, therefore, the amount of hysteresis is small, the multiplication factor for the transistor base-emitter voltage Vbe will be sufficiently small such that these graphs will be virtually parallel over the temperature range of interest.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a temperature indicator circuit with temperature hysteresis, comprising:
    a first signal comparison circuit configured to receive and compare a reference signal and a first temperature signal and in accordance therewith provide a first comparison signal with first and second signal states, wherein
        said reference signal corresponds to a reference temperature,
        said first temperature signal varies in relation to a measured temperature,
        said first signal state indicates when said first comparison signal has a first signal polarity relative to said reference signal,
        said second signal state indicates when said first comparison signal has a second polarity relative to said reference signal and opposite to said first signal polarity, and
        said first comparison signal transitions between said first and second signal states at a first approximate value of said measured temperature;
    a second signal comparison circuit configured to receive and compare said reference signal and a second temperature signal and in accordance therewith provide a second comparison signal with third and fourth signal states, wherein
        said second temperature signal varies in relation to said measured temperature,
        said third signal state indicates when said second comparison signal has a third signal polarity relative to said reference signal,
        said fourth signal state indicates when said second comparison signal has a fourth polarity relative to said reference signal and opposite to said third signal polarity, and
        said second comparison signal transitions between said third and fourth signal states at a second approximate value of said measured temperature which is higher than said first measured approximate temperature value; and
    a signal state indicating circuit, coupled to said first and second signal comparison circuits, configured to receive said first and second comparison signals and in accordance therewith provide a state signal indicating a time which follows an increase in said measured temperature above said second approximate value and precedes a decrease in said measured temperature below said first approximate value.

2. The apparatus of claim 1, wherein said first signal comparison circuit comprises a voltage comparison circuit configured to receive and compare first and second analog voltages as said reference signal and said first temperature signal and in accordance therewith provide a binary output voltage as said first comparison signal.

3. The apparatus of claim 1, wherein said second signal comparison circuit comprises a voltage comparison circuit configured to receive and compare first and second analog voltages as said reference signal and said second temperature signal and in accordance therewith provide a binary output voltage as said second comparison signal.

4. The apparatus of claim 1, wherein said signal state indicating circuit comprises a synchronous circuit configured to provide said state signal with asserted and de-asserted states, wherein said state signal is in said asserted state during when said second comparison signal is in said fourth signal state and after said first comparison signal has transitioned from said first signal state to said second signal state, and is in said de-asserted state otherwise.

5. The apparatus of claim 4, wherein said synchronous circuit comprises a flip-flop configured to receive said first comparison signal as a data signal and receive said second comparison signal as a clock signal.

6. The apparatus of claim 5, wherein said flip-flop is further configured to receive said first comparison signal as an output clear control signal.

7. The apparatus of claim 1, further comprising a reference signal circuit configured to provide said reference signal.

8. The apparatus of claim 7, wherein said reference signal circuit comprises a digital-to-analog signal conversion circuit configured to receive and convert a plurality of digital data to an analog voltage as said reference signal.

9. The apparatus of claim 1, wherein said first and third signal polarities are equal and said second and fourth signal polarities are equal.

10. An apparatus including an integrated circuit with a temperature indicator circuit having temperature hysteresis, said integrated circuit comprising:
    a substrate which includes a functional circuit integrated therein;
    a temperature sensing circuit, integrated within said substrate, configured to measure a temperature of said substrate and in accordance therewith provide first and second temperature signals which vary in respective relations to said measured temperature;

a reference signal circuit, integrated within said substrate, configured to provide a reference signal which corresponds to a reference temperature;

a first signal comparison circuit, integrated within said substrate and coupled to said reference signal circuit and said temperature sensing circuit, configured to receive and compare said reference signal and said first temperature signal and in accordance therewith provide a first comparison signal with first and second signal states, wherein said first signal state indicates when said first comparison signal has a first signal polarity relative to said reference signal, said second signal state indicates when said first comparison signal has a second polarity relative to said reference signal and opposite to said first signal polarity, and said first comparison signal transitions between said first and second signal states at a first approximate value of said measured temperature;

a second signal comparison circuit, integrated within said substrate and coupled to said reference signal circuit and said temperature sensing circuit, configured to receive and compare said reference signal and said second temperature signal and in accordance therewith provide a second comparison signal with third and fourth signal states, wherein said third signal state indicates when said second comparison signal has a third signal polarity relative to said reference signal, said fourth signal state indicates when said second comparison signal has a fourth polarity relative to said reference signal and opposite to said third signal polarity, and said second comparison signal transitions between said third and fourth signal states at a second approximate value of said measured temperature which is higher than said first measured approximate temperature value; and a signal state indicating circuit, integrated within said substrate and coupled to said first and second signal comparison circuits, configured to receive said first and second comparison signals and in accordance therewith provide a state signal indicating a time which follows an increase in said measured temperature above said second approximate value and precedes a decrease in said measured temperature below said first approximate value.

11. The apparatus of claim 10, wherein said temperature sensing circuit comprises a plurality of bipolar junction transistors configured to receive a plurality of bias voltages and in accordance therewith provide first and second output voltages as said first and second temperature signals.

12. The apparatus of claim 11, wherein said temperature sensing circuit further comprises a plurality of resistive voltage division circuits configured to receive a plurality of bias currents and in accordance therewith provide said plurality of bias voltages.

13. The apparatus of claim 10, wherein said reference signal circuit comprises a digital-to-analog signal conversion circuit configured to receive and convert a plurality of digital data to an analog voltage as said reference signal.

14. The apparatus of claim 10, wherein said first signal comparison circuit comprises a voltage comparison circuit configured to receive and compare first and second analog voltages as said reference signal and said first temperature signal and in accordance therewith provide a binary output voltage as said first comparison signal.

15. The apparatus of claim 10, wherein said second signal comparison circuit comprises a voltage comparison circuit configured to receive and compare first and second analog voltages as said reference signal and said second temperature signal and in accordance therewith provide a binary output voltage as said second comparison signal.

16. The apparatus of claim 10, wherein said signal state indicating circuit comprises a synchronous circuit configured to provide said state signal with asserted and de-asserted states, wherein said state signal is in said asserted state during when said second comparison signal is in said fourth signal state and after said first comparison signal has transitioned from said first signal state to said second signal state, and is in said de-asserted state otherwise.

17. The apparatus of claim 16, wherein said synchronous circuit comprises a flip-flop configured to receive said first comparison signal as a data signal and receive said second comparison signal as a clock signal.

18. The apparatus of claim 17, wherein said flip-flop is further configured to receive said first comparison signal as an output clear control signal.

19. The apparatus of claim 10, wherein said first and third signal polarities are equal and said second and fourth signal polarities are equal.

20. A method of indicating temperature with temperature hysteresis, comprising the steps of:

receiving a reference signal which corresponds to a reference temperature;

receiving first and second temperature signals which vary in respective relations to a measured temperature;

comparing said reference signal and said first temperature signal and in accordance therewith generating a first comparison signal with first and second signal states by generating said first signal state when said first comparison signal has a first signal polarity relative to said reference signal, generating said second signal state when said first comparison signal has a second polarity relative to said reference signal and opposite to said first signal polarity, and transitioning said first comparison signal between said first and second signal states at a first approximate value of said measured temperature;

comparing said reference signal and said second temperature signal and in accordance therewith generating a second comparison signal with third and fourth signal states by generating said third signal state when said second comparison signal has a third signal polarity relative to said reference signal, generating said fourth signal state when said second comparison signal has a fourth polarity relative to said reference signal and opposite to said third signal polarity, and transitioning said second comparison signal between said third and fourth signal states at a second approximate value of said measured temperature which is higher than said first measured approximate temperature value; and receiving said first and second comparison signals and in accordance therewith generating a state signal indicating a time which follows an increase in said measured temperature above said second approximate value and precedes a decrease in said measured temperature below said first approximate value.

21. The method of claim 20, wherein said step of comparing said reference signal and said first temperature signal and in accordance therewith generating a first comparison signal with first and second signal states comprises comparing first and second analog voltages as said reference signal and said first temperature signal and in accordance therewith generating a binary output voltage as said first comparison signal.

22. The method of claim 20, wherein said step of comparing said reference signal and said second temperature signal and in accordance therewith generating a second comparison signal with third and fourth signal states comprises comparing first and second analog voltages as said reference signal and said second temperature signal and in accordance therewith generating a binary output voltage as said second comparison signal.

23. The method of claim 20, wherein said step of receiving said first and second comparison signals and in accordance therewith generating a state signal comprises synchronously asserting said state signal during when said second comparison signal is in said fourth signal state and after said first comparison signal has transitioned from said first signal state to said second signal state, and de-asserting said state signal otherwise.

24. The method of claim 23, wherein said step of synchronously asserting said state signal comprises capturing said first comparison signal as a data signal in response to receiving said second comparison signal as a clock signal.

25. The method of claim 24, wherein said step of de-asserting said state signal comprises clearing said captured first comparison signal in response to receiving a transition of said first comparison signal from said fourth signal state to said third signal state.

26. The method of claim 20, further comprising the step of receiving and converting a plurality of digital data to an analog voltage as said reference signal.

27. A method of indicating the temperature of an integrated circuit with temperature hysteresis, comprising the steps of:
  measuring, within a substrate which includes a functional circuit integrated therein, a temperature of said substrate and in accordance therewith generating first and second temperature signals which vary in respective relations to said measured temperature;
  generating, within said substrate, a reference signal which corresponds to a reference temperature;
  comparing, within said substrate, said reference signal and said first temperature signal and in accordance therewith generating a first comparison signal with first and second signal states by
    generating said first signal state when said first comparison signal has a first signal polarity relative to said reference signal,
    generating said second signal state when said first comparison signal has a second polarity relative to said reference signal and opposite to said first signal polarity, and
    transitioning said first comparison signal between said first and second signal states at a first approximate value of said measured temperature;
  compare, within said substrate, said reference signal and said second temperature signal and in accordance therewith generating a second comparison signal with third and fourth signal states by
    generating said third signal state when said second comparison signal has a third signal polarity relative to said reference signal,
    generating said fourth signal state when said second comparison signal has a fourth polarity relative to said reference signal and opposite to said third signal polarity, and
    transitioning said second comparison signal between said third and fourth signal states at a second approximate value of said measured temperature which is higher than said first measured approximate temperature value; and
  receiving said first and second comparison signals and in accordance therewith generating, within said substrate, a state signal indicating a time which follows an increase in said measured temperature above said second approximate value and precedes a decrease in said measured temperature below said first approximate value.

28. The method of claim 27, wherein said step of measuring a temperature of said substrate and in accordance therewith generating first and second temperature signals which vary in respective relations to said measured temperature comprises biasing a plurality of bipolar junction transistors with a plurality of bias voltages and in accordance therewith generating first and second output voltages as said first and second temperature signals.

29. The method of claim 28, wherein said step of measuring a temperature of said substrate and in accordance therewith generating first and second temperature signals which vary in respective relations to said measured temperature further comprises biasing a plurality of resistive voltage division circuits with a plurality of bias currents and in accordance therewith generating said plurality of bias voltages.

30. The method of claim 27, wherein said step of generating a reference signal which corresponds to a reference temperature comprises receiving and converting a plurality of digital data to an analog voltage as said reference signal.

31. The method of claim 27, wherein said step of comparing said reference signal and said first temperature signal and in accordance therewith generating a first comparison signal with first and second signal states comprises comparing first and second analog voltages as said reference signal and said first temperature signal and in accordance therewith generating a binary output voltage as said first comparison signal.

32. The method of claim 27, wherein said step of comparing said reference signal and said second temperature signal and in accordance therewith generating a second comparison signal with third and fourth signal states comprises comparing first and second analog voltages as said reference signal and said second temperature signal and in accordance therewith generating a binary output voltage as said second comparison signal.

33. The method of claim 27, wherein said step of receiving said first and second comparison signals and in accordance therewith generating a state signal comprises synchronously asserting said state signal during when said second comparison signal is in said fourth signal state and after said first comparison signal has transitioned from said first signal state to said second signal state, and de-asserting said state signal otherwise.

34. The method of claim 33, wherein said step of synchronously asserting said state signal comprises capturing said first comparison signal as a data signal in response to receiving said second comparison signal as a clock signal.

35. The method of claim 34, wherein said step of de-asserting said state signal comprises clearing said captured first comparison signal in response to receiving a transition of said first comparison signal from said fourth signal state to said third signal state.

* * * * *